US007237319B2

(12) United States Patent
Kasahara et al.

(10) Patent No.: US 7,237,319 B2
(45) Date of Patent: Jul. 3, 2007

(54) METHOD OF MANUFACTURING A PLANE COIL

(75) Inventors: Tetsuichiro Kasahara, Nagano (JP); Hitoshi Yoshikawa, Nagano (JP)

(73) Assignee: Shinko Electric Industries Co., Ltd., Nagano-shi (JP)

( * ) Notice: Subject to any disclaimer, the term of this patent is extended or adjusted under 35 U.S.C. 154(b) by 499 days.

(21) Appl. No.: 10/833,268

(22) Filed: Apr. 28, 2004

(65) Prior Publication Data

US 2004/0231138 A1 Nov. 25, 2004

(30) Foreign Application Priority Data

May 14, 2003 (JP) ............................ 2003-136064

(51) Int. Cl.
*H01F 7/06* (2006.01)
*B29C 65/00* (2006.01)

(52) U.S. Cl. ......................... 29/602.1; 29/606; 29/832; 29/835; 29/829; 29/847; 156/248

(58) Field of Classification Search ............... 29/602.1, 29/606, 832, 835, 829, 847; 156/248, 250, 156/192, 233, 255, 261; 428/147, 148, 200, 428/202, 214
See application file for complete search history.

(56) References Cited

U.S. PATENT DOCUMENTS 3,535,182 A * 10/1970 Meier-Maletz .............. 156/209
4,482,874 A * 11/1984 Rubertus et al. ............ 333/185
4,900,386 A 2/1990 Richter-Jorgensen ....... 156/250
5,174,847 A 12/1992 Pichl .......................... 156/234
5,645,932 A * 7/1997 Uchibori ..................... 428/347
6,423,168 B1 * 7/2002 Valiulis ...................... 156/226
6,652,904 B1 * 11/2003 Phani et al. .................. 427/74

FOREIGN PATENT DOCUMENTS

EP 0 665 705 8/1995
EP 1 085 480 3/2001
JP 2003-257770 9/2003
WO WO 03/024708 A1 3/2003

OTHER PUBLICATIONS

European Search Report dated Nov. 2, 2004.

* cited by examiner

*Primary Examiner*—A. Dexter Tugbang
*Assistant Examiner*—Tai Van Nguyen
(74) *Attorney, Agent, or Firm*—Armstrong, Kratz, Quintos, Hanson & Brooks, LLP

(57) ABSTRACT

First, a sheet member which is being unwound and conveyed from a winding body, and in which a conductive film is stuck on a support sheet, is stamped in such a shape that a coil portion, a frame portion defined around the coil portion, and a joining portion connecting the coil portion to the frame portion are left unstamped. Next, a protective sheet which is made sticky, is stuck onto a surface of the stamped structure where the conductive film is stuck, and then the support sheet is peeled off. Next, an insulative support sheet which is being unwound and conveyed from a winding body, is stuck onto a surface of the structure with the protective sheet stuck thereon where the stamped conductive film is stuck, and then the protective sheet is peeled off.

6 Claims, 5 Drawing Sheets

METHOD OF MANUFACTURING A PLANE COIL

BACKGROUND OF THE INVENTION (a) Field of the Invention

The present invention relates to a technique of manufacturing a plane coil, and more particularly relates to a method of manufacturing a plane coil composed of a conductor wound in a spiral substantially on a plane.

(b) Description of the Related Art

In non-contact type IC cards, IC tags, and the like, a plane coil is used as an antenna for communicating information between an embedded semiconductor element (IC) and an external card processing apparatus or the like. Conventionally, such a plane coil has been formed by winding a coated wire or by etching or stamping a metal plate.

A method using a coated wire requires a step of interweaving or embedding a wound coil into a support base material in order that the wound coil holds a required shape of antenna. However, the coated wire for use is an inelastic thin wire, so that the coated wire is difficult to wound and not suitable for mass processing. Moreover, since this method requires the step of interweaving the wound coil or the like after the winding, it has a disadvantage in that a manufacturing cost thereof is increased. Thus, it has been difficult for the method of manufacturing a plane coil by winding a coated wire to achieve a reduction in cost and a mass production.

On the contrary, a method of manufacturing a plane coil by etching or stamping is more advantageous than the above method by winding a coated wire, in terms of cost, mass production, and manufacturing period. In an example of the method using etching, a metal foil or sheet is pressed and stuck on an insulative support base material (film of heat-resistant resin such as polyethylene terephthalate (PET)), and a surface on which the metal foil or the like is stuck is then etched to be formed in a required shape of coil.

On the other hand, in an example of the method using stamping, a metal sheet is stamped in a shape of a pattern in which coils (antennas) are partly connected to each other, and a support base material such as a PET film is stuck onto the stamped metal sheet, with keeping the stamped shape, and then, joining portions which partly connect the coils are cut off. In this case, in a conventional method of attaching the PET film, hot melt resin is coated on a surface (on a side to be brought into contact with the metal sheet) of the PET film which is being unwound and conveyed from a winding body on which the PET film is wound in a roll. The PET film is then stuck onto the metal sheet with this hot melt resin interposed therebetween. Herein, the hot melt resin is provided with a sticking property by heating.

As described above, the method of manufacturing a plane coil by etching or stamping a metal sheet is more advantageous than the method of manufacturing a plane coil by winding a coated wire, in terms of cost, mass production, and the like. Comparing the method using etching with that using stamping, the former is more disadvantageous than the latter because of higher manufacturing cost.

On the other hand, the method using stamping employs hot melt resin when sticking the PET film (support base material) onto the stamped metal sheet as described above, and thus has a problem in that the manufacturing cost is increased by use of the hot melt resin.

The applicant has already proposed a technique of coping with such a problem (Japanese Patent Application No. 2002-288628 filed on Oct. 1, 2002). In the proposed technique described in the specification and drawings, a sheet member (in which a metal foil is stuck on a surface of an insulative support sheet with a pressure-sensitive adhesive interposed therebetween) is used as a starting material for manufacturing a plane coil, and the sheet member is in advance wound on a reel in a roll. The sheet member which is being unwound and conveyed from the reel is stamped in a required shape of coil. After the stamped metal foil (coils) is stuck onto a base film such as a PET film (after transferred and laminated), unnecessary joining portions between the coils are cut off. In the proposed technique, a plane coil is manufactured by using a seal material which is easily commercially available at comparatively low cost, and applying a stamping technique. Accordingly, it is possible to achieve a reduction in the manufacturing period as well as a reduction in cost and a mass production.

However, this method uses a metal foil with a very small thickness as the material forming the coils, and the conductor width (line width) of the spiral coil is extremely small. Accordingly, the rigidity of the coil (metal foil) cannot be maintained, and it is difficult to transfer/laminate the coil onto the base film with keeping the shape of the stamped coil. Therefore, it can be supposed that a coil will be deformed, a part of the coil will be cut off depending on the conditions, or adjacent conductors in the coil will be brought into contact with each other (short-circuited between each other). Consequently, a reliability of the plane coil as a finally obtained product is lowered, and thus there is room for improvement in this respect.

SUMMARY OF THE INVENTION

An object of the present invention is to provide a method of manufacturing a plane coil which achieves a reduction in cost, a mass production, and a reduction in the manufacturing period, and which enables a coil with no rigidity to be transferred/laminated onto a support base material such as a base film while stably keeping the shape thereof, and thus contributes to an improvement in the reliability as a product.

To attain the above object, according to one aspect of the present invention, there is provided a method of manufacturing a plane coil, comprising the steps of: stamping a sheet member which is being unwound and conveyed from a winding body, and in which a conductive film is stuck on a support sheet, in a required shape of coil; sticking a protective sheet which is made sticky, onto a surface of the stamped structure where the conductive film is stuck; peeling off the support sheet; sticking a surface of the structure with the protective sheet stuck thereon, the surface of the structure being on a side where the stamped conductive film is stuck, onto an insulative support sheet, which is being unwound and conveyed from a winding body; and peeling off the protective sheet.

According to the method of manufacturing a plane coil of this aspect, the sheet member (in which the conductive sheet is stuck on the support sheet) which is being unwound and conveyed from the winding body is stamped in a required shape of coil, and then, the shape of coil is once held by sticking the protective sheet onto the surface (namely, a surface of the sheet member with no rigidity where a coil is formed) of the stamped structure where the conductive film is stuck. Further, the support sheet is peeled off from the sheet member, and the coil is stuck onto an insulative support sheet together with the protective sheet holding the shape of coil, and the protective sheet is then peeled off.

According to the manufacturing method of the present invention, since the plane coil is manufactured by stamping the sheet member which is being unwound and conveyed from the winding body, it is possible to achieve a reduction in cost, a mass production, and a reduction in the manufacturing period. Furthermore, the shape of stamped coil with no rigidity is once held by the protective sheet and then stuck onto the final support base material (insulative support sheet). Accordingly, the coil with no rigidity can be easily transferred/laminated onto the base film or the like while stably holding the shape, which contributes to an improvement in the reliability of the plane coil as a product finally obtained.

Also, according to another aspect of the present invention, there is provided a method of manufacturing a plane coil, comprising the steps of: stamping a sheet member which is being unwound and conveyed from a winding body, and in which a conductive film is stuck on a support sheet, in a required shape of coil; sticking a surface of the stamped structure with the conductive film stuck thereon onto a circumferential surface of a first roller which is made sticky, and simultaneously peeling off the support sheet from the stamped structure by use of a second roller cooperating with the first roller; and sticking an insulative support sheet which is being unwound and conveyed from a winding body, by use of a third roller cooperating with the first roller, onto the stamped conductive film which is being stuck onto the circumferential surface of the first roller and conveyed.

Also in the method of manufacturing a plane coil according to this aspect, stamping is applied as is the case of the manufacturing method according to the first aspect. Moreover, the shape of coil is held by sticking the surface (namely, a surface of the sheet member with no rigidity where a coil is formed) of the sheet member stamped in a required shape of coil where the conductive film is stuck onto the circumferential surface of the adhesive roller (first roller). Accordingly, the manufacturing method according to this aspect has the like advantages as the manufacturing method according to the first aspect.

Furthermore, according to this aspect, the protective sheet, which is required in the first aspect, is unnecessary, and this also eliminates the need for sticking and peeling off the protective sheet. Accordingly, the running cost can be further reduced, and the manufacturing period can be further shortened. In addition, mass productivity can be further improved since the support sheet is peeled off from the sheet member by use of the second roller which cooperates with the adhesive roller while the stamped sheet member is held on the adhesive roller.

DESCRIPTION OF THE PREFERRED EMBODIMENTS

Hereinafter, preferred embodiments of the present invention will be described with reference to the accompanying drawings.

Figure 1:
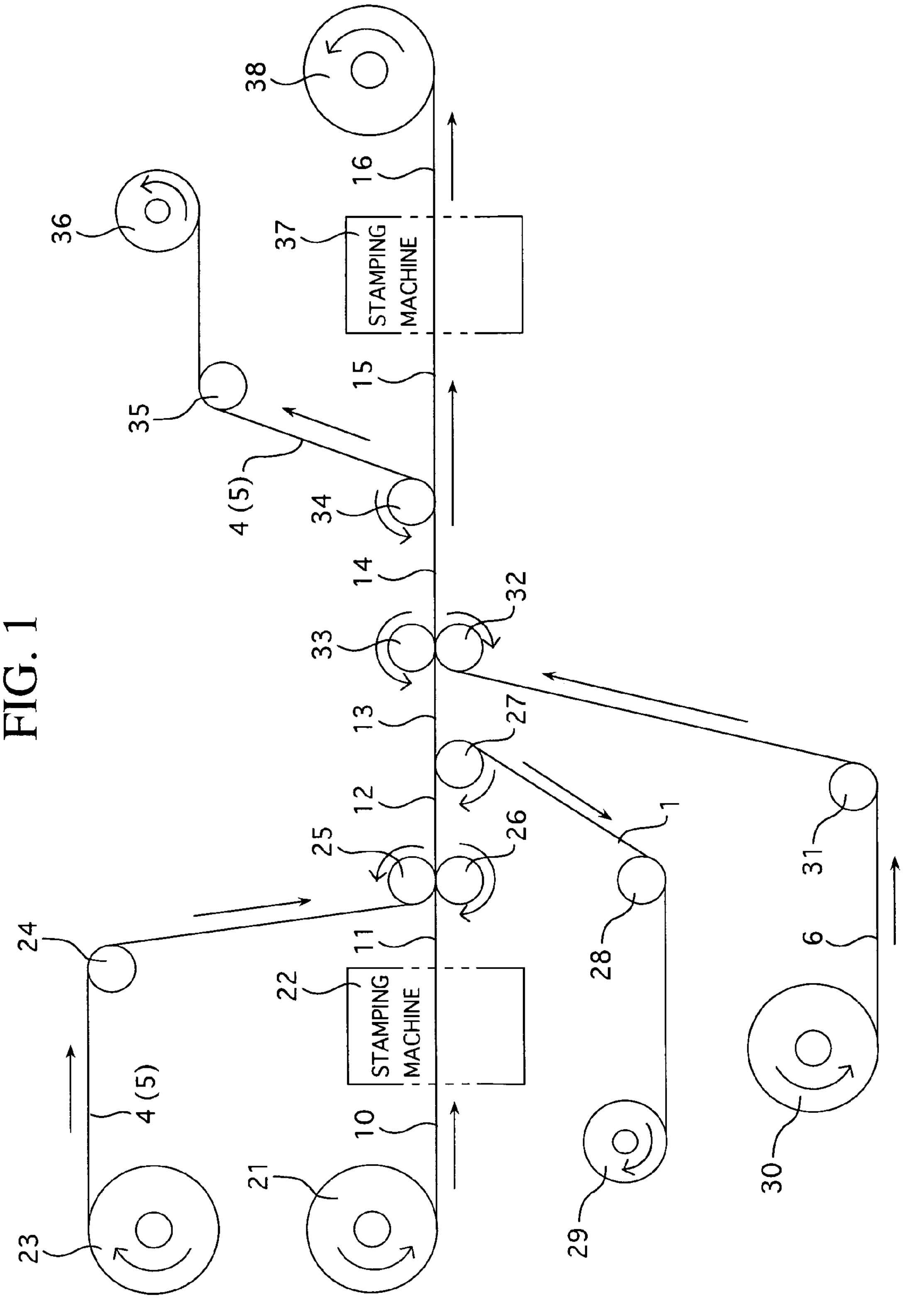
FIG. 1 is a view schematically showing an equipment configuration for manufacturing a plane coil according to an embodiment of the present invention along a manufacturing process.

FIG. 1 is a view schematically showing an equipment configuration for manufacturing a plane coil according to an embodiment of the present invention along a manufacturing process, and FIGS. 2A to 2G are views showing the manufacturing process thereof.

Figure 2A:
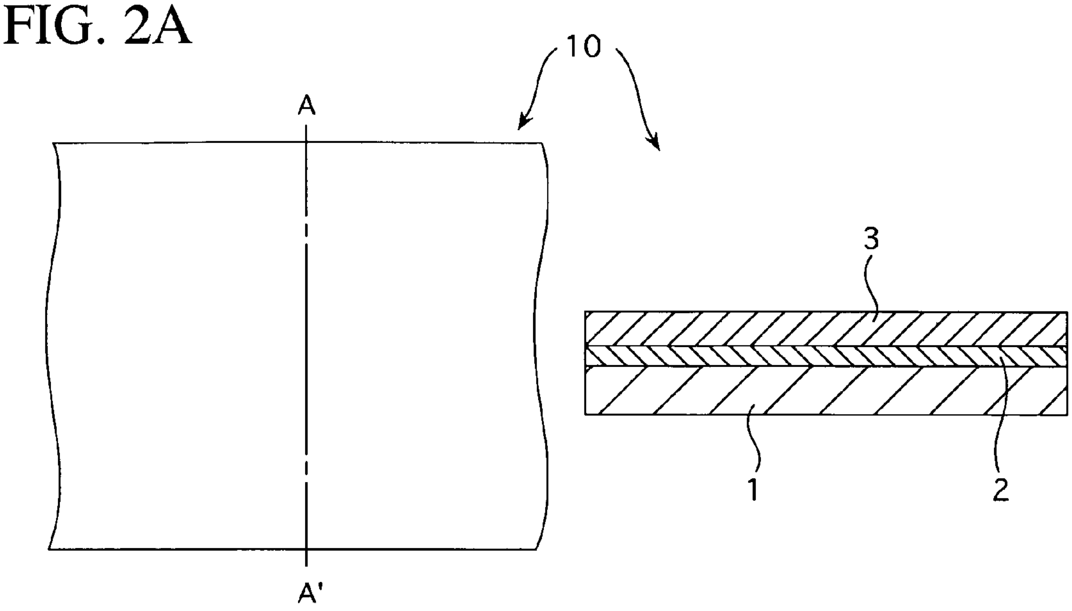
FIGS. 2A to 2G are views showing the manufacturing process of the plane coil according to the embodiment of FIG. 1.
Figure 2B:
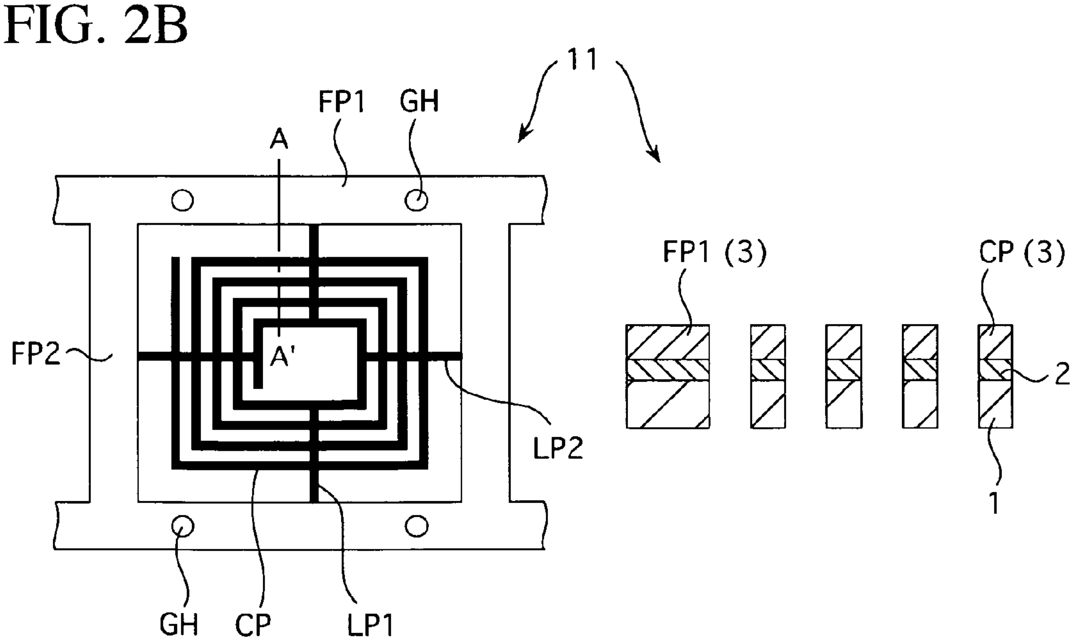
Figure 2C:
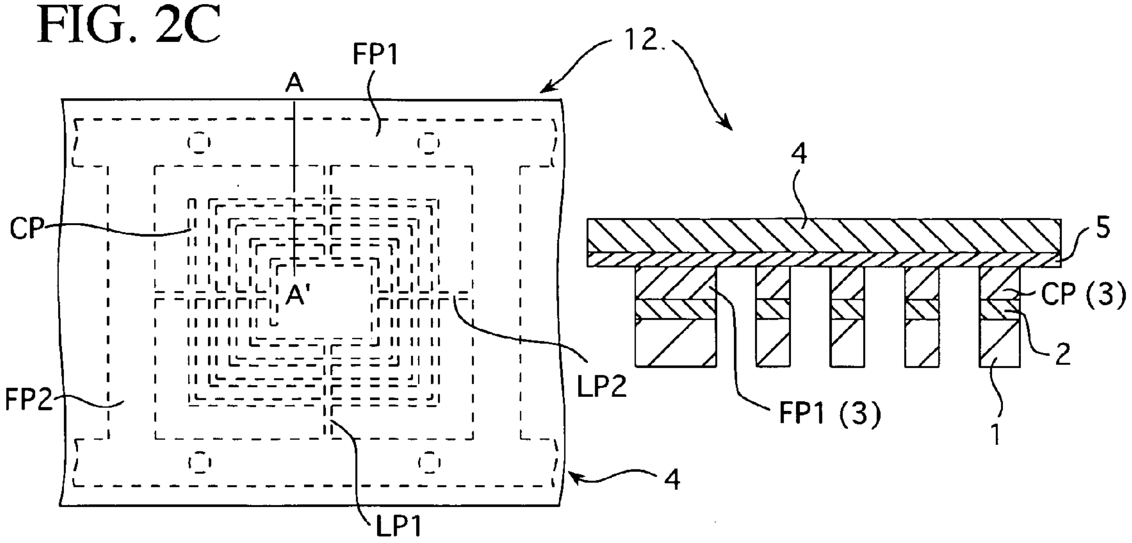
Figure 2D:
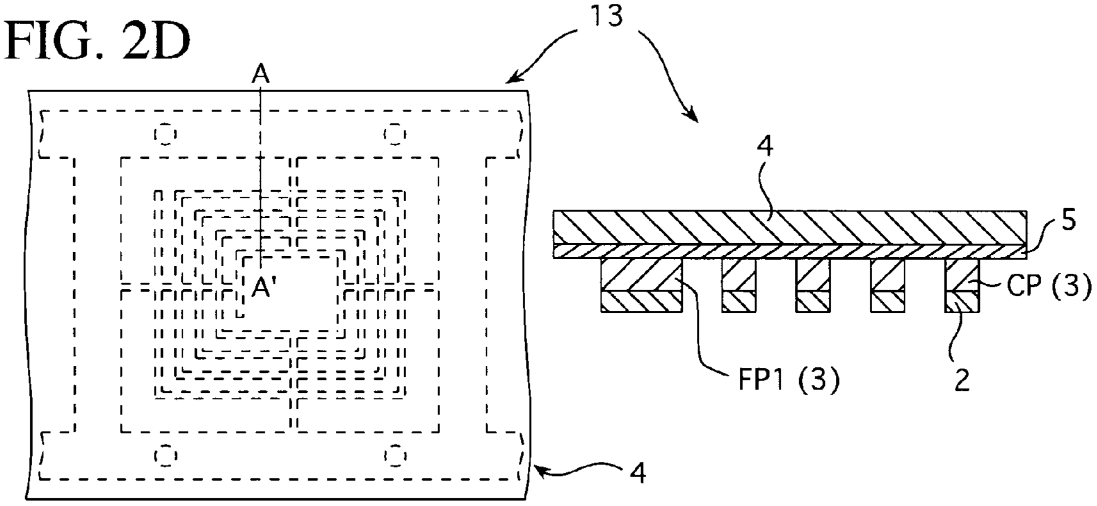
Figure 2E:
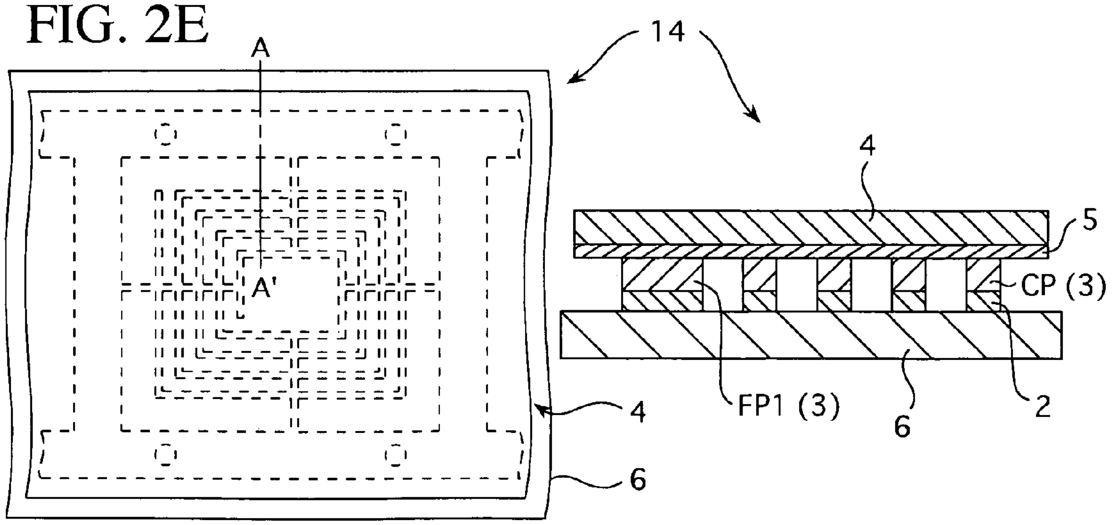
Figure 2F:
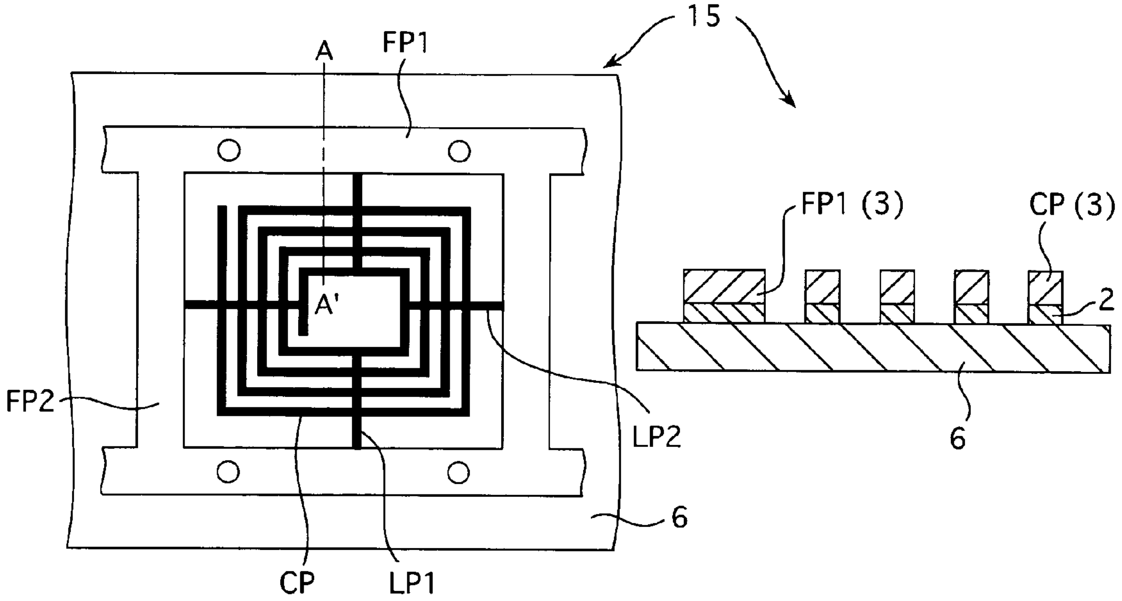
Figure 2G:
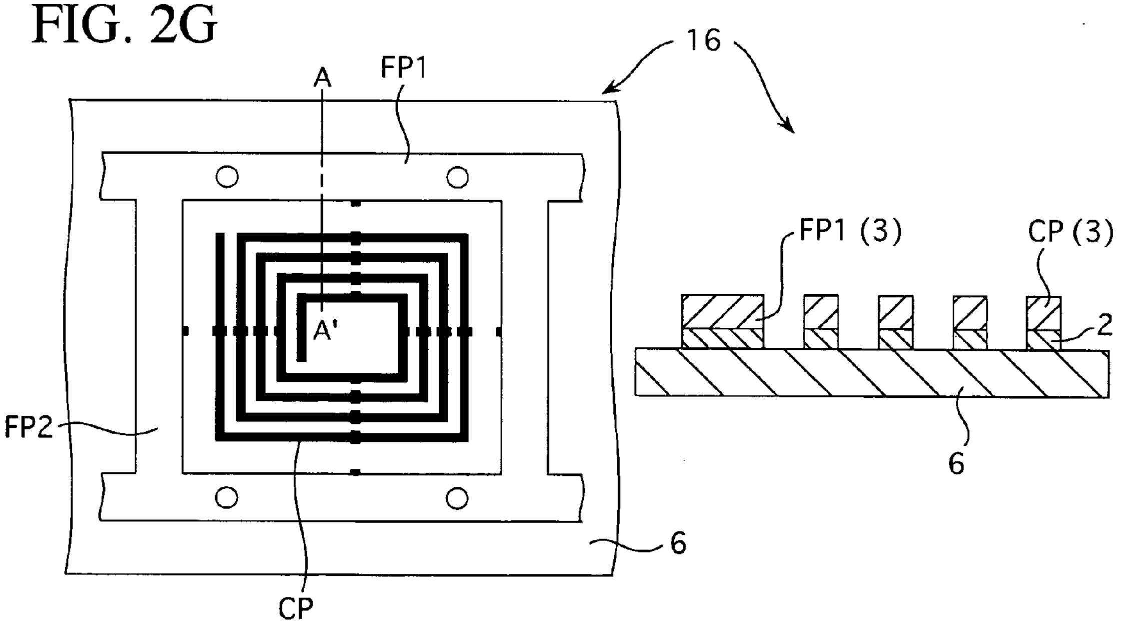

First, FIG. 2A shows a planar configuration (on the left) of a sheet member 10 used as a starting material for manufacturing a plane coil according to the embodiment and a cross-sectional view (on the right) thereof taken along a line A–A' of the planar configuration. The sheet member 10 used in this embodiment basically has a three-layer structure in which a conductive film 3 is stuck on a surface of an insulative support sheet 1 with a pressure-sensitive adhesive layer 2 interposed therebetween. For example, a glassine paper is used as the insulative support sheet 1, an acrylic pressure-sensitive adhesive is used as the material of the pressure-sensitive adhesive layer 2, and an aluminum (Al) foil is used as the conductive film 3.

On a surface (a side to be brought into contact with the pressure-sensitive adhesive layer 2) of the glassine paper 1, a release agent (not shown) is in advance coated by spraying or the like. This release agent facilitates separation of the glassine paper 1 from the aluminum foil 3 in the process of manufacturing the plane coil as described later. Examples of the release agent for use include a higher fatty acid and derivatives thereof, high melting point wax, silicone oil, and polyvinyl alcohol. This glassine paper (support sheet) 1 is peeled off during the course of manufacturing the plane coil and becomes unnecessary as described later. Accordingly, the attribute of the support sheet is not necessarily “insulative”. A conductive support sheet can be used instead of the glassine paper 1.

As the material of the pressure-sensitive adhesive layer 2, other than the acrylic based pressure-sensitive adhesive, epoxy-based, or polyester-based, pressure-sensitive adhesive can be used. Usual bonding adhesives may be used instead of the pressure-sensitive adhesives. The pressure-sensitive adhesives have lower heat resistance than the usual bonding adhesives. However, the pressure-sensitive adhesives have an advantage in that a curing step is not required because the pressure-sensitive adhesives have a property of adhering to a member to be attached only by a slight pressure applied at room temperature. Accordingly, it is desirable to selectively use the pressure-sensitive adhesives or the usual bonding adhesives depending on requirements. For the conductive film 3, a copper foil, or a metal foil made of an alloy such as Al or Cu, can be suitably used other than the aluminum foil.

As described above, for the sheet member 10 used as the starting material for manufacturing a plane coil, a material with the three-layer structure is used in this embodiment. In the material with the three-layer structure, the glassine paper 1 on which the release agent is coated and the aluminum foil 3 having a surface to which the pressure-bonded adhesive layer 2 is attached, are stuck on each other with the release agent and the pressure-bonded adhesive layer 2 interposed therebetween. As this sheet member 10, for example, one commercially available as an “aluminum tack seal material” can be suitably used. Note that the thicknesses of the glassine paper 1, the pressure-sensitive adhesive layer 2, and the aluminum foil 3, are selected to be about 70 μm, 20 μm, and 30 μm, respectively.

Next referring to FIG. 1, in the illustrated equipment configuration, reference numeral 21 denotes a winding body on which the sheet member 10 is wound in a roll, and reference numeral 22 denotes a stamping machine which stamps the sheet member 10, which is being unwound and conveyed from the winding body 21 as shown by arrows, in a required shape of coil. Specifically, the stamping machine 22 stamps the sheet member 10 in such a shape, as described later, that a required coil portion, a frame portion defined around the coil portion, and a joining portion connecting the coil portion to the frame portion are left unstamped. Although not shown, the stamping machine 22 includes a support table where the sheet member 10 is loaded, a die (punch) properly arranged so as to correspond to the pattern shape including the required coil portion, the frame portion, and the joining portion, and the like.

Also, reference numeral 23 denotes a winding body on which a protective sheet, which is made sticky, is wound in a roll. In this embodiment, the protective sheet includes a heat-resistant resin film 4 on one surface of which a pressure-sensitive adhesive or a bonding adhesive, which is less adhesive than that of the pressure-sensitive adhesive layer 2 of the sheet member 10, is coated (to form a pressure-sensitive adhesive layer 5). Reference numeral 24 denotes a guide roller which guides the protective sheet 4 (5), which is being unwound and conveyed from the winding body 23 as shown by arrows. Reference numerals 25 and 26 denote a pressure-bonding roller and a holding roller, respectively, by which the protective sheet 4 (5) guided via the guide roller 24 is stuck onto a surface of the sheet member (structure 11) stamped by the stamping machine 22, the surface being on a side where the aluminum foil is stuck. Reference numeral 27 denotes a separation roller by which the support sheet (glassine paper) 1 is peeled off from the structure 12 transmitted between the rollers 25 and 26. Reference numeral 28 denotes a guide roller which guides the peeled-off glassine paper 1. Reference numeral 29 denotes a winding roller which winds the glassine paper 1 transmitted via the guide roller 28.

Also, reference numeral 30 denotes a winding body on which the insulative support sheet (PET film 6 in this embodiment) is wound in a roll. Reference numeral 31 denotes a guide roller which guides the PET film 6, which is being unwound and conveyed from the winding body 30 as shown by arrows. Reference numerals 32 and 33 denote a pressure-bonding roller and a holding roller, respectively. The rollers 32 and 33 serve to stick a surface of the structure 13, from which the glassine paper 1 is peeled off, onto a surface of the PET film 6 opposite to the surface where the protective sheet 4 (5) is stuck, the PET film 6 being guided via the guide roller 31. Reference numeral 34 denotes a separation roller by which the protective sheet 4 (5) is peeled off from the structure 14 transmitted between the rollers 32 and 33. Reference numeral 35 denotes a guide roller which guides the peeled-off protective sheet 4 (5). Reference numeral 36 denotes a winding roller which winds the protective sheet 4 (5) transmitted via the guide roller 35.

Also, reference numeral 37 denotes a stamping machine which stamps the structure 15 at the joining portion of the stamped aluminum foil (including the pressure-sensitive adhesive layer) which is stuck on the PET film 6 and a portion of the PET film 6 corresponding to the joining portion. Although not shown, the stamping machine 37 includes a support table where the structure 15 is loaded, a die (punch) arranged so as to correspond to the shape of the joining portion, and the like. Reference numeral 38 denotes a winding roller which winds a structure stamped by the stamping machine 37, namely, a plane coil 16 as a finally obtained product.

Hereinafter, a method of manufacturing the plane coil 16 will be described with reference to FIGS. 2A to 2G, showing the manufacturing steps thereof, and the equipment configuration of FIG. 1. FIGS. 2B to 2G show planar configurations (on the left) in the states (the structures 11 to 16) after individual processing steps for the starting material (the sheet member 10) shown in FIG. 2A, and cross-sectional configurations (on the right) taken along lines A–A' of the respective planar configurations.

In the first step (FIG. 2B), the sheet member 10 (in which the aluminum foil 3 is stuck on the glassine paper 1 with the pressure-sensitive adhesive layer 2 interposed therebetween), which is being unwound and conveyed from the winding body 21, is stamped by the stamping machine 22 into a shape such that a required coil portion CP, frame portions FP1 and FP2, joining portions LP1 and LP2 are left unstamped. Herein, the frame portions FP1 and FP2 are defined around the coil portion CP, and the joining portions LP1 and LP2 connects the coil portion CP to the frame portions FP1 and FP2, respectively. The joining portions LP1 and LP2 also include portions connecting conductors, which constitute the coil portion CP, inwardly and outwardly. At this time, guide holes GH for positioning, which are reference for stamping, are formed in the frame portions FP1 on both sides of the sheet 10 which are parallel to the conveying direction thereof.

In the next step (FIG. 2C), the protective sheet 4 (5) guided from the winding body 23 via the guide roller 24 is stuck by the pressure-bonding roller 25 and the holding roller 26 onto a surface of the structure 11 stamped in the previous step where the aluminum foil 3 (the coil portion CP, frame portions FP1, FP2, and joining portions LP1, LP2) is stuck. In other words, the shape of the coil portion CP is transferred/laminated onto the protective sheet 4 (5).

In the next step (FIG. 2D), the glassine paper 1 is peeled off from the structure 12 conveyed between the rollers 25 and 26 and wound to be recovered by the separation roller 27, guide roller 28, and winding roller 29. At this time, the glassine paper 1 can be easily peeled off since the release agent is coated on a surface (on the side that the pressure-sensitive adhesive layer 2 is to be brought into contact) of the glassine paper 1. On the other hand, the pressure-sensitive adhesive layer 2 is left adhering to the aluminum foil 3 (the coil portion CP, frame portions FP1, FP2, and joining portions LP1, LP2) even if the glassine paper 1 is separated.

In the next step (FIG. 2E), a surface (to which the pressure-sensitive adhesive layer 2 is exposed) of the structure 13, from which the glassine paper 1 is peeled off in the previous step, the surface being opposite to the surface where the protective sheet 4 (5) is stuck, is stuck by the pressure-bonding roller 32 and the holding roller 33 onto the PET film 6, the PET film 6 being guided from the winding body 30 via the guide roller 31. In other words, the coil portion CP once held on the protective sheet 4 (5) is transferred/laminated again onto the PET film 6.

In the next step (FIG. 2F), the protective sheet 4(5) is peeled off from the structure 14 transmitted between the rollers 32 and 33 and wound to be recovered by the separation roller 34, guide roller 35, and the winding roller 36. At this time, the aluminum foil 3 (the coil portion CP, frame portions FP1, FP2, and joining portions LP1, LP2) is left adhering to the pressure-sensitive adhesive layer 2 even if the protective sheet 4 (5) is peeled off, because the pressure-sensitive adhesive layer 5 of the protective sheet is less adhesive than the pressure-sensitive adhesive layer 2 of the sheet member. In other words, the coil portion CP is held on the PET film 6 with the pressure-sensitive adhesive layer 2 interposed therebetween without deforming.

In the last step (FIG. 2G), the structure 15, from which the protective sheet 4 (5) is peeled off in the previous step, is stamped by the stamping machine 37 at the joining portions LP1 and LP2 of the stamped aluminum foil 3 (including the pressure-sensitive adhesive layer 2), which is stuck on the PET film 6, and at the portions of the PET film 6 corresponding to the joining portions LP1 and LP2. In the example shown in FIG. 2G, openings at the stamped portions of the joining portions LP1 and LP2 are omitted. With this stamping, the coil portion CP is cut off from the frame portions FP1 and FP2 in the periphery thereof. The structure 16 stamped by the stamping machine 37, namely, the plane coil 16 as a product is then wound by the winding roller 38.

As described above, according to the method of manufacturing the plane coil 16 of this embodiment, first, the sheet member 10 (in which the aluminum foil 3 is stuck on the glassine paper 1 with the pressure-sensitive adhesive layer 2 interposed therebetween), which is being unwound and conveyed from the winding body 21, is stamped in a required shape of coil by the stamping machine 22. Then, the protective sheet 4 (5) is stuck onto the surface, where the aluminum foil 3 (the coil portion CP, frame portions FP1, FP2, and joining portions LP1, LP2) is stuck, of the stamped structure 11. Thus, the shape of coil is once held. Further, the glassine paper 1 is peeled off from the sheet member (the structure 12). The stamped aluminum foil 3 is stuck onto the PET film 6 together with the protective sheet 4 (5) holding the shape of coil, and the protective sheet 4 (5) is then peeled off. Then, the portions corresponding to the joining portions LP1 and LP2 in the aluminum foil 3 (including the pressure-sensitive adhesive layer 2) are stamped out by the stamping machine 37, thus obtaining the plane coil 16.

According to the embodiment as described above, the plane coil 16 is manufactured by using the aluminum tack seal material, which is easily available at comparatively low cost, as the sheet member 10, and applying a stamping technique. Accordingly, it is possible to achieve a reduction in the manufacturing period, as well as a reduction in cost and a mass production.

Furthermore, the stamped aluminum foil (the coil portion CP) with no rigidity is once held by the protective sheet 4 (5) to hold the shape thereof and then stuck onto the PET film 6 which is a final support base material. Accordingly, the coil with no rigidity can be easily transferred/laminated onto the PET film 6 while stably holding the shape, which contributes to an improvement in the reliability of the plane coil 16 as a product.

Figure 3:
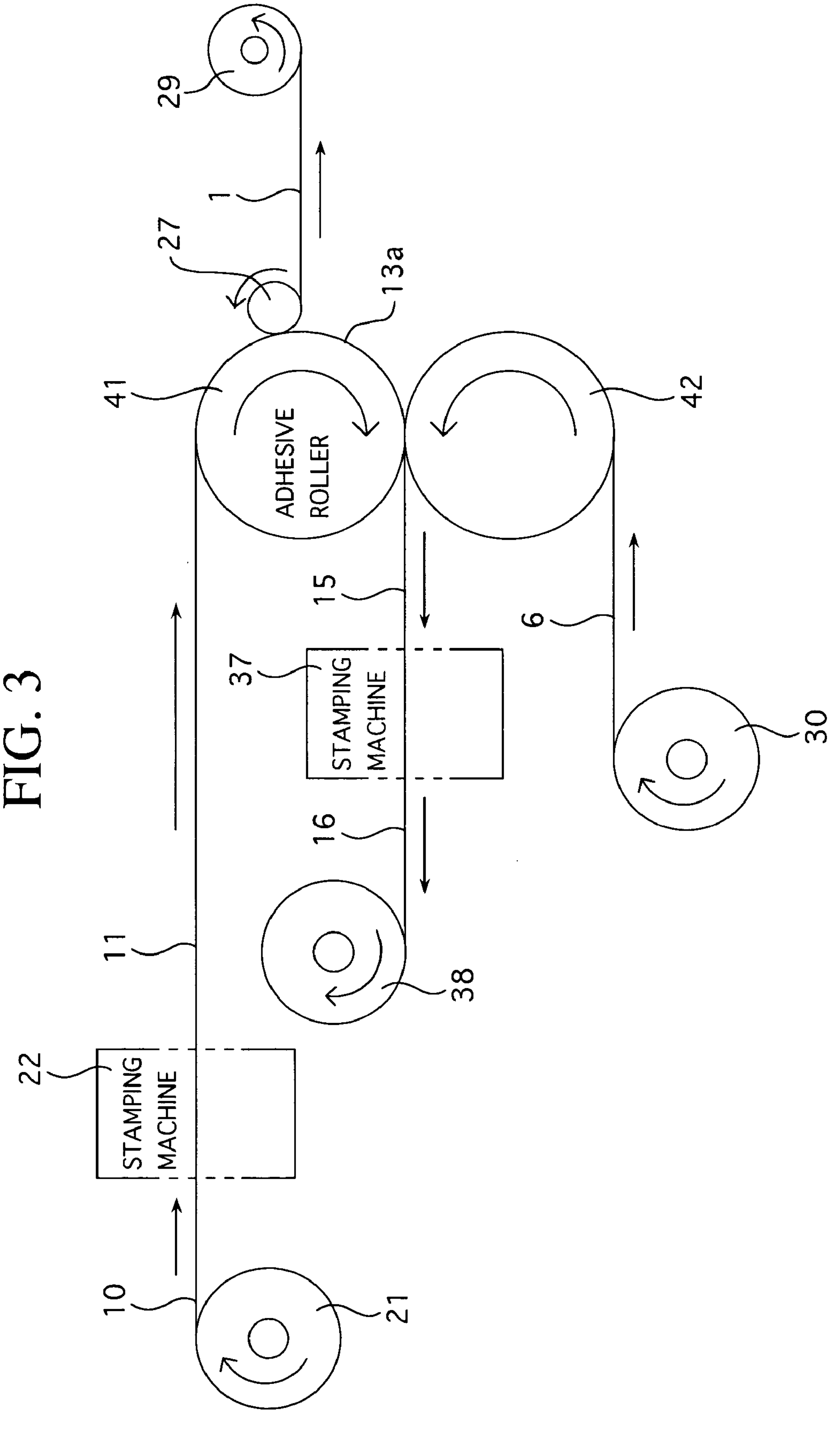
FIG. 3 is a view schematically showing an equipment configuration for manufacturing a plane coil according to another embodiment of the present invention along a manufacturing process.

In the aforementioned embodiment, the stamped aluminum foil (coil portion CP) with no rigidity is once held by the protective sheet 4 (5) to hold the shape and then transferred/laminated onto the PET film 6. In this case, the protective sheet 4 (5) becomes unnecessary in the end. In view of the entire materials used for manufacturing the plane coil, partial waste will be produced. FIG. 3 exemplifies an embodiment with such a disadvantage removed.

An equipment configuration according to the embodiment shown in FIG. 3 differs from that according to the aforementioned embodiment (FIG. 1) in the following points: the configuration (the winding body 23, guide roller 24, pressure-bonding roller 25, holding roller 26, separation roller 34, guide roller 35, and winding roller 36) related to supply, sticking, separation, and recovery of the protective sheet 4 (5) is not included; the pressure-bonding roller 32 and the holding roller 33 for separating the PET film 6 are not provided; an adhesive roller 41 (a first roller which is made sticky) is provided; a separation roller 27 (a second roller) is provided so as to cooperate with the adhesive roller 41; and a non-adhesive roller (a third roller) 42 for sticking the PET film 6 is provided so as to cooperate with the adhesive roller 41. The other components and functions thereof are basically the same as those in the case of the embodiment of FIG. 1, and thus the description thereof is omitted.

Processings related to the manufacturing of the plane coil 16 are basically the same as those performed in the manufacturing process of FIGS. 2A to 2G, and thus the description thereof is omitted. Note, in the embodiment shown in FIG. 3, the surface of the structure 11 stamped by the stamping machine 22, on which the aluminum foil 3 is stuck, is stuck onto the circumferential surface of the adhesive roller 41 while the glassine paper 1 is peeled off from the structure 11 by use of the separation roller 27. The structure 13*a* obtained after the glassine paper 1 peeled off differs from the structure 13 shown in FIG. 2D in that the protective sheet 4 (5) is not stuck thereon. Furthermore, the PET film 6 is stuck onto the structure 13*a*, which is being stuck onto the circumferential surface of the adhesive roller 41 and conveyed, by use of the non-adhesive roller 42.

In the present embodiment, a pressure-sensitive adhesive or a bonding adhesive with a specific adhesion is coated on the circumferential surface of the adhesive roller 41 in order to smoothly and continuously perform: the sticking of the stamped structure 11 onto the adhesive roller 41; the separation of the glassine paper 1; and the sticking of the PET film 6 onto the structure 13*a* after the separation. Specifically, a pressure-sensitive or bonding adhesive including such an adhesion that satisfies the relationship $A<B<C$ is coated on the circumferential surface of the adhesive roller 41 where A is adhesive strength of the pressure-sensitive or bonding adhesive (pressure-sensitive adhesive layer 2) in the sheet member 10 to the glassine paper 1, B is adhesive strength of the pressure-sensitive or bonding adhesive coated on the circumferential surface of the adhesive roller 41 to the aluminum foil 3, and C is adhesive strength of the pressure-sensitive or bonding adhesive (pressure-sensitive adhesive layer 2) in the sheet member 10 to the PET film 6. As such a pressure-sensitive or bonding adhesive, for example, a silicone-based pressure-sensitive adhesive can be used.

Also in the method of manufacturing the plane coil 16 according to the embodiment shown in FIG. 3, stamping technique is applied as is the case of the manufacturing method according to the embodiment shown in FIG. 1. Moreover, the shape of coil is held by sticking the surface, where the aluminum foil 3 is stuck, of the sheet member with no rigidity, which is stamped in a required shape of coil, onto the circumferential surface of the adhesive roller 41. Accordingly, the manufacturing method according to the embodiment shown in FIG. 3 has the like advantages (reduction in cost, achievement of mass production, and reduction in the manufacturing period) as the manufacturing method according to the embodiment shown in FIG. 1.

Furthermore, according to the present embodiment, the protective sheet 4 (5), which is required in the embodiment shown in FIG. 1, is unnecessary, and this eliminates the need for sticking and peeling off the protective sheet. Accordingly, the running cost can be further reduced, and the manufacturing period can be further shortened. In addition, mass productivity can be further improved since the glassine paper 1 is peeled off by the separation roller 27 while the stamped sheet member is being held on the adhesive roller 41.

What is claimed is:

1. A method of manufacturing a plane coil, comprising the steps of:

stamping a sheet member which is being unwound and conveyed from a winding body, and in which a conductive film is stuck on a support sheet, in a required shape of coil;

sticking a protective sheet which is made sticky, onto a surface of the stamped structure where the conductive film is stuck;

peeling off the support sheet;

sticking a surface of the structure with the protective sheet stuck thereon, the surface of the structure being a side where the stamped conductive film is stuck, onto an insulative support sheet which is being unwound and conveyed from a winding body; and peeling off the protective sheet, wherein the step of stamping a sheet member in a required shape of coil includes stamping the sheet member in such a shape that a coil portion, a frame portion defined around the coil portion, and a joining portion connecting the coil portion to the frame portion are left unstamped, and wherein the step of peeling off the protective sheet is followed by a step of stamping a portion corresponding to said joining portion, of the structure with said insulative support sheet stuck thereon.

2. The method according to claim 1, wherein the sheet member is composed of a member including said support sheet having a surface on which a release agent is coated and said conductive film having a surface to which a pressure-sensitive adhesive or a bonding adhesive adheres, the respective surfaces of the support sheet and the conductive film being stuck together, and wherein a pressure-sensitive adhesive or a bonding adhesive, which is less adhesive than the pressure-sensitive adhesive or the bonding adhesive used in said sheet member, is coated onto a surface of said protective sheet which is to be stuck onto said conductive film.

3. The method according to claim 1, wherein said conductive film is made of a metal foil.

4. A method of manufacturing a plane coil, comprising the steps of:

stamping a sheet member which is being unwound and conveyed from a winding body, and in which a conductive film is stuck on a support sheet, in a required shape of coil;

sticking a surface of the stamped structure with the conductive film stuck thereon onto a circumferential surface of a first roller which is made sticky, and simultaneously peeling off said support sheet from the stamped structure by use of a second roller cooperating with the first roller; and sticking an insulative support sheet which is being unwound and conveyed from a winding body, by use of a third roller cooperating with the first roller, onto the stamped conductive film which is being stuck onto the circumferential surface of the first roller and conveyed wherein the step of stamping a sheet member in a required shape of coil includes stamping the sheet member in such a shape that a coil portion a frame portion defined around the coil portion, and a joining portion connecting the coil portion to the frame portion are left unstamped, and wherein the step of sticking an insulative support sheet is followed by a step of stamping a portion corresponding to said joining portion, of the structure with the insulative support sheet stuck thereon.

5. The method according to claim 4, wherein the sheet member is composed of a member including said support sheet having a surface on which a release agent is coated and said conductive film having a surface to which a pressure-sensitive adhesive or a bonding adhesive adheres, the respective surfaces of the support sheet and the conductive film being stuck together, and wherein a pressure-sensitive adhesive or a bonding adhesive is coated onto the circumferential surface of said first roller, the pressure-sensitive or bonding adhesive having such an adhesion that adhesive strength of said stamped structure acting on said conductive film is larger than adhesive strength of the pressure-sensitive or bonding adhesive in said sheet member acting on said support sheet via said release agent, and smaller than adhesive strength of the pressure-sensitive or bonding adhesive in the sheet member acting on said insulative support sheet.

6. The method according to claim 4, wherein said conductive film is made of a metal foil.

* * * * *